(12) United States Patent
Tzeng et al.

(10) Patent No.: US 6,647,404 B2
(45) Date of Patent: Nov. 11, 2003

(54) DOUBLE PRECISION FLOATING POINT MULTIPLIER HAVING A 32-BIT BOOTH-ENCODED ARRAY MULTIPLIER

(75) Inventors: Tzungren Allan Tzeng, San Jose, CA (US); Choon Ping Chng, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/217,740

(22) Filed: Aug. 12, 2002

(65) Prior Publication Data

US 2003/0005016 A1 Jan. 2, 2003

Related U.S. Application Data

(62) Division of application No. 09/396,236, filed on Sep. 15, 1999, now Pat. No. 6,446,104.

(51) Int. Cl.⁷ .............................. G06F 7/52; G06F 7/44
(52) U.S. Cl. ........................................ 708/628; 708/503
(58) Field of Search .......................... 708/503, 627–632

(56) References Cited

U.S. PATENT DOCUMENTS 5,528,529 A    6/1996  Seal .......................... 364/736
5,909,385 A  * 6/1999  Nishiyama et al. ......... 708/630
6,081,823 A    6/2000  Purcell et al. .............. 708/629
6,247,036 B1 * 6/2001  Landers et al. ............. 708/603
6,269,384 B1   7/2001  Oberman ..................... 708/497
6,490,607 B1 * 12/2002 Oberman ..................... 708/503

* cited by examiner

Primary Examiner—Tan V Mai
(74) Attorney, Agent, or Firm—Gunnison, McKay & Hodgson, L.L.P.; Philip J. McKay

(57) ABSTRACT

A double-precision multiplier for use in the floating point pipeline of a processor has an array multiplier and a carry-save partial-product accumulator. Double precision multiplication is accomplished by generating a plurality of partial products and summing these in the carry-save partial-product accumulator. The partial-product accumulator has a carry-save adder, a sum register, a carry-out counter and an extender. The carry-out counter receives a carry outputs of the carry-save adder and array multiplier, and the extender is coupled to extend the sum register dependent upon the contents of the carry-out counter. The extension occurs during addition of the most significant partial product to the sum of less significant partial products.

2 Claims, 5 Drawing Sheets

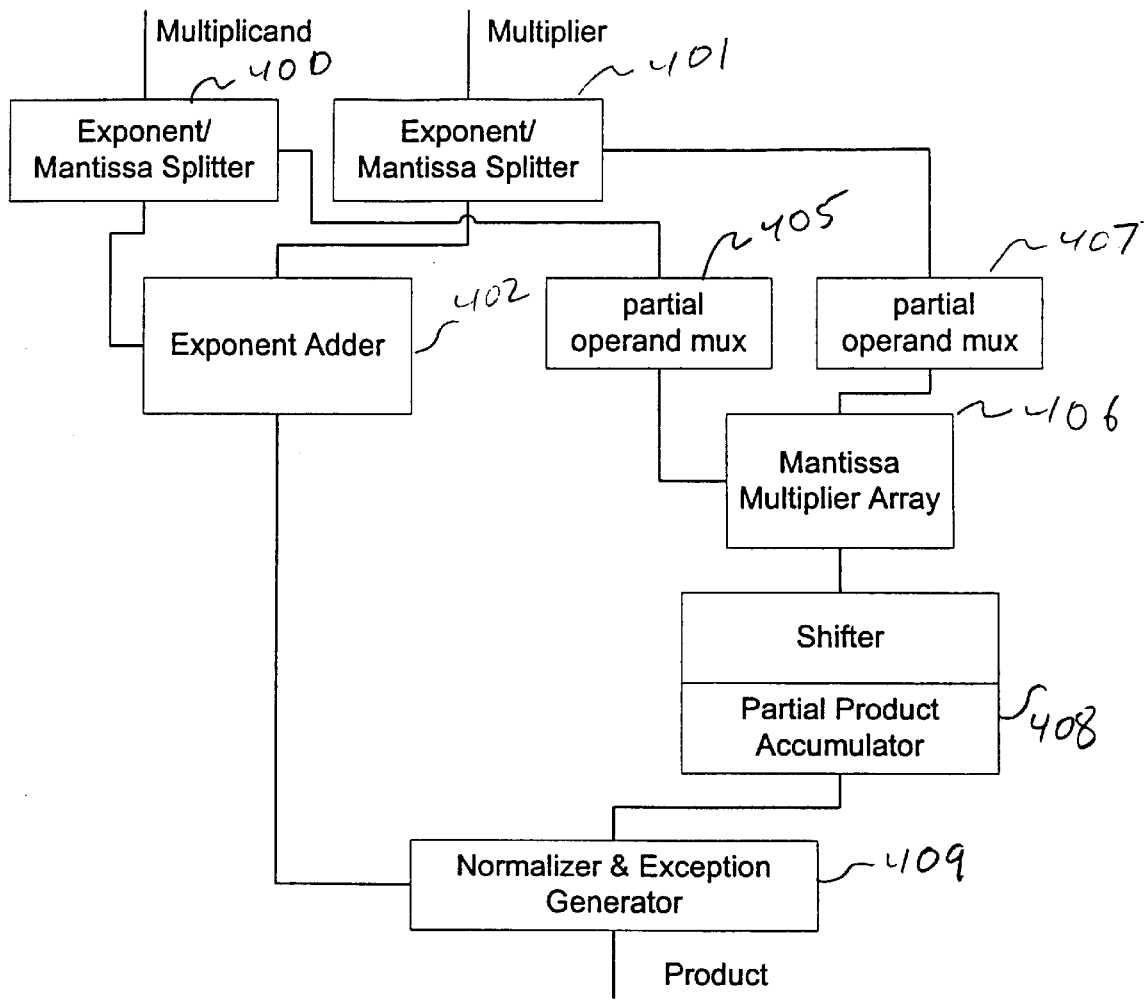
Figure 4
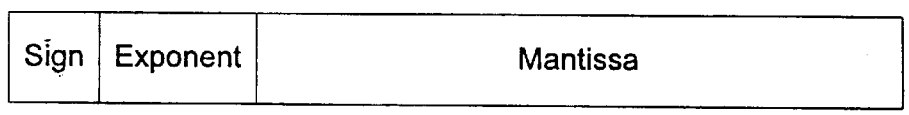
Figure 3, Typical Floating Point Format

DOUBLE PRECISION FLOATING POINT MULTIPLIER HAVING A 32-BIT BOOTH-ENCODED ARRAY MULTIPLIER

This application is a divisional application of U.S. patent application Ser. No. 09/396,236, entitled "DOUBLE PRECISION FLOATING POINT MULTIPLIER HAVING A 32-BIT BOOTH-ENCODED ARRAY MULTIPLIER" of Tzungren Allan Tzeng and Choon Ping Chng, filed on Sep. 15, 1999 now U.S. Pat. No. 6,446,104 and assigned to the Assignee of the present Application, and which is incorporated herein by reference in its entirety.

FIELD OF THE INVENTION

The invention relates to the field of multiplier hardware for digital computer systems. In particular it relates to multipliers that use multiple passes of single precision hardware to perform double precision multiplication.

BACKGROUND OF THE INVENTION

Array multipliers, such as Wallace-tree multipliers with and without Booth recoding, require a gate count that grows proportionally to the square of the number of bits of each operand. Hence a 53-bit multiplier requires close to three times the area as does a 32-bit multiplier array.

The number of logic levels in the worst-case data path through a 53-bit multiplier array is greater than the number of logic levels in the worst-case data path of a 32-bit multiplier array. This means that, all other factors being equal, a 53-bit multiplier is slower than a 32-bit multiplier array.

Most modern processors have 32-bit integer multiply instructions. Several common specifications for computer floating point operations, including the IEEE 754 and Digital VAX specifications, require a 24-bit (including one hidden bit) mantissa for single precision floating point, and a 53-bit mantissa for double precision floating point. These machines therefore need to be able to quickly multiply pairs of 32 bit operands, pairs of 24-bit operands, and pairs of 53-bit operands in performing their integer and floating point arithmetic. These machines also must be able to quickly add 32-bit integer operands, as well as 53 bit and 24 bit denormalized mantissas.

It is known that a 32-bit hardware multiplier can be used to perform a 53-bit unsigned multiply by performing a sequence of four multiply operations, each generating a partial product, and summing the partial products. A way that this may be done is as follows:

| | |
|---|---|
| [Bits 52 ... 32 = A] [Bits 31 ... 0 = B] | Break down the multiplicand |
| [Bits 52 ... 32 = C] [Bits 31 ... 0 = D] | Break down the multiplier |
| T1 = B * D | Compute partial products |
| T2 = D * A * 2**32 | and perform shift |
| T3 = C * B * 2**32 | |
| T4 = A * C * 2**64 | |
| T6 = T1 + T2 + T3 | |
| T5 = T6 + T4 | Sum the partial products, extending T1, T2, T3, and T4 as required. |
| Product = top 53 bits (T5) | Drop the least significant bits. |

T5 is nominally 106 bits wide. When performing a floating point operation, it is necessary that the product bits be aligned into the correct bit positions for the mantissa of the floating point result. If T1, T2, T3, and T4 are summed in an adder, a left shift of 12 bit positions of T4 relative to T2 and T3 is required for proper alignment.

Some computer programs require more single-precision floating point and integer multiply operations than double-precision floating point operations. Machines running these programs can provide fast single precision and integer multiply operations with slower but adequate double precision multiply using a sequence of four multiply operations in each double-precision floating-point multiply instruction.

The Booth recoding algorithm is commonly used in large multiplier arrays to hold down the number of partial products that must be added during a multiply. While a classic thirty two bit Wallace-tree binary array multiplier generates and adds thirty two partial products, an array multiplier using two-bit Booth recoding need generate and adds only half as many partial products, although the logic required for generating each partial product is somewhat more complex. Reducing the number of partial products not only can reduce the number of gates in the array, but produces a faster multiplier by reducing the number of gate delays in the worst-case critical path through the array.

In the basic binary two-bit Booth algorithm, a pair of bits of the multiplier are considered for each partial product. If those bits are zero, the partial product is zero. If those bits are one, the partial product is the multiplicand. If those bits are two, the partial product is a single-bit-shifted (multiplied by two) multiplicand. If those bits are three, the partial product is minus the multiplicand, with one added in the next partial product—giving a net partial product term of four times the multiplicand minus the multiplicand equaling three times the multiplicand.

A common version of the Booth multiply is the modified booth recoding multiply. In this version, the multiplier is recoded from a binary number, where each digit is a 1 or a 0, to a number having fewer digits each in the range {-2, -1, 0, +1, +2}. Each bit pair $\{B_{n+1}, B_n\}$ of the multiplier is transformed by a three-input digit-encoder circuit that considers bit $\{B_{n-1}\}$ of next lower significance to the bit pair being encoded according to the formula:

| | |
|---|---|
| +2 if $(B_{n-1}$ & $B_n$ & $\sim B_{n+1})$ | 110 |
| +1 if $((B_{n-1}$ xor $B_n)$ & $\sim B_{n+1})$ | 010\|100 |
| -1 if $((B_{n-1}$ xor $B_n)$ & $B_{n+1}$ | 101\|011 |
| -2 if $(\sim B_{n-1}$ & $\sim B_n$ & $B_{n+1})$ | 001 |
| 0 otherwise | 000\|111 |

The partial products of the multiplier (booth_digit*multiplicand) are generated by taking a zero, a left shift of the multiplicand (+2), the multiplicand (+1), the negation of the multiplicand (-1) or the negation of a left shift of the multiplicand (-2). One such partial product is generated for each bit pair of the multiplier, these partial products are shifted appropriately and summed to generate the product. For modern array multipliers, the product is generated by an array of carry-save adders of structure similar to a Wallace tree.

In the Booth recoding circuit described above, a term Bn−1 is used. In all bit-pairs except the least significant bit pair, this bit is the most significant multiplier bit of the bit pair of less significance than the bit pair being encoded. In the least significant bit pair, this bit is normally a zero. In multipliers that perform a multiply of high precision from a sequence of lower-precision multiplies, it is known that this bit may be used as a carry input to the higher digits of the multiply.

SUMMARY OF THE INVENTION

A multiplier has been constructed that performs a high precision multiply by performing a sequence of four lower-precision multiplies, each of the four generating a partial product, and summing the partial products. This multiplier breaks down the a multiply into a sequence of four multiply operations.

| | |
|---|---|
| [Bits 52 . . . 32 = A] [Bits 31 . . . 0 = B] | Break down the multiplicand |
| [Bits 52 . . . 32 = C] [Bits 31 . . . 0 = D] | Break down the multiplier |
| P1 = (B * D) right shifted by 64 bits | Compute partial products |
| P2 = (D * A) right shifted by 32 bits | and perform shift |
| P3 = (C * B) right shifted by 32 bits | |
| P4 = (A left shifted by 6 bits) * (C left shifted by 6 bits) | |
| Product = (P1 + P2 + P3 + P4) | Sum the partial products. |

The multiplier performs three initial cycles to compute the partial products P1, P2, and P3.

The left-shift-by-12 bit positions required in the example to align the resulting 53 bits of product is accomplished by the left shift of each of the A and C operands 6 bit positions, this places the significant bits of P4 at the appropriate inputs of the adder used to sum the partial products. The top 22 bits of partial sums P3, P2, and the effect of P1, are positioned in the 22 least significant bits of the adder by shift operations.

The multiplier used for all four cycles of the multiply is Booth encoded. Each two-bit booth recoder cell requires three inputs, (Bn+1, Bn, Bn−1), so that an add of three times the multiplicand can be represented as a subtract of one times the multiplicand with an add of four times the multiplicand. It may therefore be necessary to force an extra addition when the multiplier is split into fields as in this design.

To get the correct result using the booth encoded multiplier, two techniques have been used. In the first technique the booth recoding cell that receives the raw multiplier bits 32 and 33 during computation of P4 must also receive multiplier bit 31. This is the same booth recoding cell that receives multiplier bits 6 and 7 as {$B_n$, $B_{n+1}$} during computation of the partial product P4. A multiplexor has been found necessary such that the Bn−1 input of this recoding cell may either be bit 5 of the multiplier or bit 31 of the multiplier; in this way the correct result is attained. Bit 31 of the multiplier may be obtained for this multiplexor directly from the multiplier register or by latching bit 31 during the preceding, P3, cycle.

In an alternative technique, an effectively 34-bit booth encoder is used during computation of P1, P2, and P3, having its two most significant input bits ($B_{n+1}$ and $B_n$) driven to zero. The $B_{n-1}$ bit of the top encoder cell is the most significant bit (Bit 31) of the operand. The multiplier array has a partial stage corresponding to this top encoder cell, wherein any necessary correction term is generated and added.

It has also been found that each of the partial products P2, and P3 may be zero extended as they are summed. P1, however, must be conditionally extended with 0's if there is an explicit carry out of the multiplier array, and extended with 1's if there is no carry out. Then, prior to adding P4, the sum of P1, P2, and P3 is extended with one of four possible constants depending on the number of explicit carry out signals generated by the multiplier during computation of P1 and the summing adder during computation of P2 and P3. These constants are 03FDH, 03FEH, 03FFH, and 0000H, where 0FFDH is used if no explicit carry out signals occurred and 0000H is used if three carry out signals occurred.

BRIEF DESCRIPTION OF THE DRAWINGS

FIG. 3 an illustration of the bit fields of a floating point number as often used in typical computer systems;

FIG. 4 a block diagram of a floating point multiplier portion of a floating point pipeline, showing the configuration of the array multiplier, as may be used in the computer system;

DETAILED DESCRIPTION OF THE PREFERRED EMBODIMENT

Figure 1:
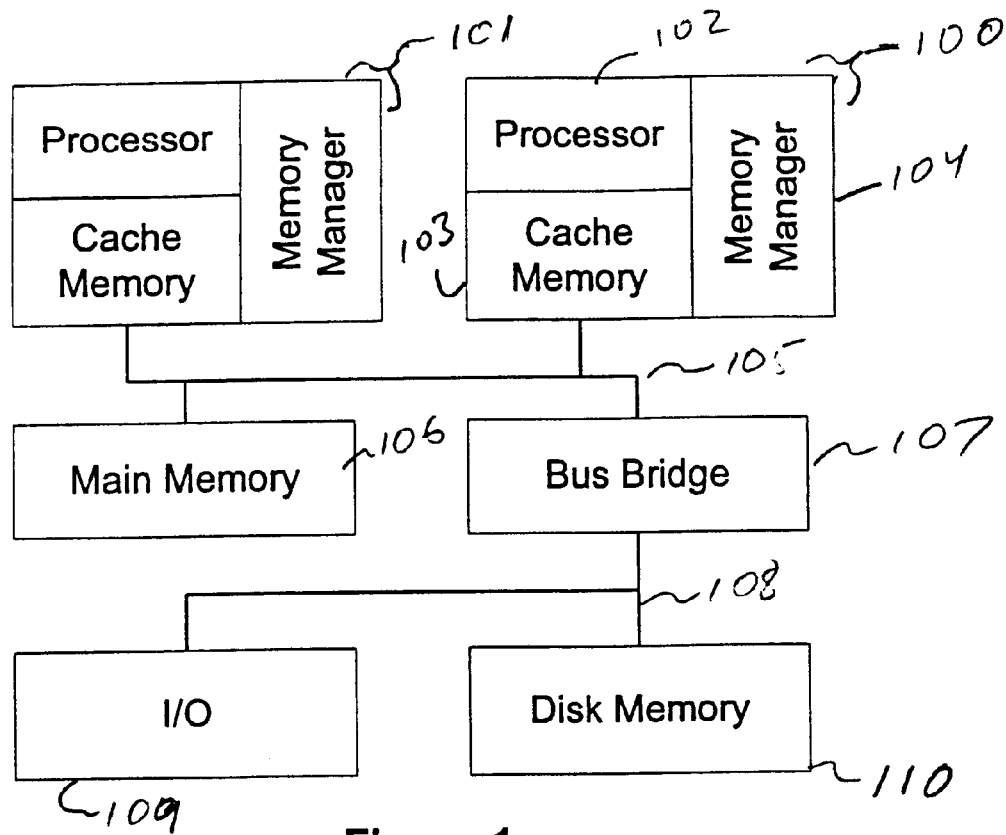
FIG. 1 is a block diagram of a generalized computer system.
Figure 2:
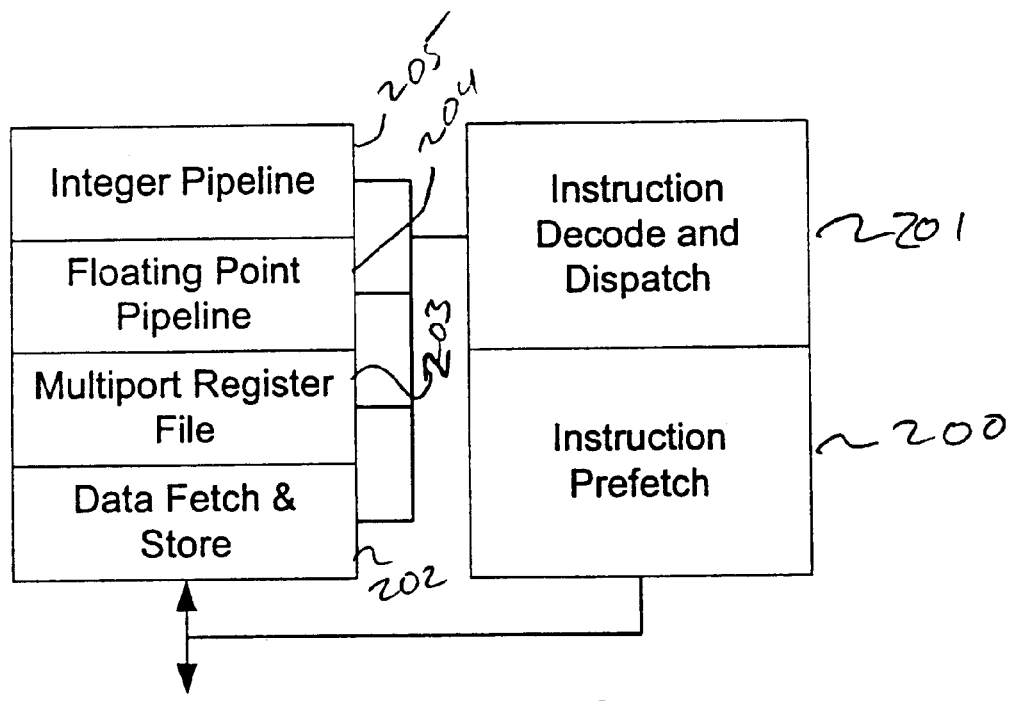
FIG. 2 a block diagram of the processor of the generalized computer system.

Many computer systems used today, such as those portrayed in FIG. 1, have a processing element 100. One or more additional processing elements 101 may also be present, as is supported by symmetric multiprocessing operating systems including Solaris, Linux, and Windows NT. Each processing element usually has a processor 102, a Cache memory 103, and a memory manager 104 that determines which memory addresses are cacheable and translates memory addresses from a virtual address space to a physical address space.

Each processing element communicates over one or more data busses 105 to a main memory 106, which may include additional memory management functions, and, usually through a bus bridge 107 and an additional bus 108, to I/O devices 109, including disk memory devices 110. There are many ways of implementing such computer systems, for example some of the I/O functions 109, including the Disk Memory 110, may communicate directly with the main memory. Further, the Main Memory 106 block may also contain one or more additional levels of cache memory.

In the processor 102 of each processing element, there is usually a unit for fetching instructions and tracking instruction addresses 200, an instruction decoder and dispatcher 201, and a data fetch and store unit 202 that initiates and controls data transfers between a multiport register file 203 and the various memory and I/O devices of the system, including the cache memory 103, main memory 106, disk memory 110 and I/O devices 109. There are also generally an floating point execution pipeline 204 and an integer execution pipeline 205 that receive data from the multiport register file 203, operate upon it, and write results back to the multiport register file 203. The floating point execution pipeline 204 and integer execution pipeline 205 may alternatively be combined into one unit; use of a 32 bit by 32 bit multiplier array is particularly desirable in processors having these units merged. Further, even if the floating point execution pipeline 204 and the integer execution pipeline 205 are not fully merged it is advantageous for these units to share a single multiplier array of 34×32 or 32×32 size because of the high silicon cost of large multiplier arrays.

Floating point numbers, as shown in FIG. 3, are generally comprised of three separate fields. A sign bit 300 represents whether the number is positive or negative. The magnitude of the floating point number is that of the mantissa field value 301 multiplied by a base value raised to the power indicated by an exponent field 302. The base value is fixed for each floating point format, two being a common base value. The IEEE 754 specification provides detailed descriptions of a single precision floating point format, where all three of the sign, exponent, and mantissa fields fit in a 32-bit word and having but 24 bits (including one hidden bit) allocated to the mantissa, and a double precision floating point format where all three fields fit in a 64-bit word and having 52 bits allocated to the mantissa. One extra, or hidden, mantissa bit is available because of the way in which normalization is performed, so the mantissa is effectively a 53 bit number. The mantissa portion of the number is always positive, negative numbers are represented through the sign bit; hence the product of a pair of mantissas is always positive.

The bits of the operand are numbered for purposes of this discussion such that bit 0 is the least significant bit of the mantissa. For a single precision operand, bit 31 is the sign bit, and bit 23 the most significant bit of the mantissa. Similarly, for double precision operands, bit 63 is the sign bit, the hidden bit is the most significant bit of the mantissa, and bit 51 the second most significant bit of the mantissa with bit 0 the least significant bit of mantissa.

FIG. 4 illustrates the functions performed by a floating point pipeline embodying the present invention during execution of a floating point multiply. Hardware used for addition, subtraction, and division is not shown. Pipeline latches and bypass logic, as are often included in floating point pipelines, are also not shown. In performing a multiplication operation, the multiplicand is split into an exponent fields and a mantissa fields by an exponent/mantissa splitter 400. Similarly, the multiplier is also broken down into exponent and mantissa fields by a second exponent/mantissa splitter 401. The exponents are then summed in the exponent adder 402 to produce an initial product exponent.

During single-precision multiply operations, the mantissa of the multiplicand is passed in its entirety through a partial-operand multiplexor 405 into a mantissa multiplier array 406. Simultaneously, the mantissa of the multiplier is passed in its entirety through a second partial-operand multiplexor 407 into the mantissa multiplier array 406. A mantissa product in carry-save form from the mantissa multiplier array 406 through a shifter into a partial product accumulator 408 where the carry is propagated. The mantissa multiplier array 406 is a 32 by 32 multiplier array, and is capable of directly multiplying the 24 bit mantissas. The mantissa product and the initial exponent product are passed to a normalizer and exception generator 409 that recombines the mantissa product and exponent product fields into a product that meets the specifications for the floating point format in use, and generates error interrupts when the product can not be represented in the floating point format in use.

During double-precision multiply operations, the exponent and mantissa are separated, and exponents added, in a manner similar to that of the single-precision multiply operation. The mantissa multiplier array 406 is a 32 by 32 multiplier array, incapable of directly multiplying the 53 bit mantissas of the preferred, IEEE 754, double precision floating point format. A sequence of four multiply operations, each generating a partial product, is therefore performed, while summing the partial products.

In a first cycle, the low 32 bits of the multiplier are selected by the multiplier partial-operand multiplexor 407 and presented to the multiplier array 406. Simultaneously, the low 32 bits of the multiplicand are selected by the multiplicand partial-operand multiplexor 405 and presented to the multiplier array 406. The partial product from the array 406 is shifted into the low 64 effective bit positions of the effective 106 bit product and latched into the partial product accumulator 408.

In a second cycle, the high 21 bits of the 53-bit multiplier are selected by the multiplier partial-operand multiplexor 407 and presented to the multiplier array 406. Simultaneously, the low 32 bits of the multiplicand are selected by the multiplicand partial-operand multiplexor 405 and presented to the multiplier array 406. The partial product from the array 406 is added to the partial product produced from the first cycle, as shifted and extended into the appropriate bit positions of the product, and latched into the partial product accumulator 408.

In a third cycle, the low 32 bits of the 53-bit multiplier are selected by the multiplier partial-operand multiplexor 407 and presented to the multiplier array 406. Simultaneously, the high 21 bits of the multiplicand are selected by the multiplicand partial-operand multiplexor 405 and presented to the multiplier array 406. The partial product from the array 406 is shifted into the appropriate bit positions of the effective 106 bit product, added to the partial product produced from the second cycle, and latched into the partial product accumulator 408.

In a fourth cycle, the high 21 bits of the 53-bit multiplier are selected by the multiplier partial-operand multiplexor 407 and presented to the multiplier array 406 left shifted six places. Simultaneously, the high 21 bits of the multiplicand are selected by the multiplicand partial-operand multiplexor 405 and presented to the multiplier array 406 left shifted six places. The partial product from the array 406 is produced in the appropriate bit positions of the effective 106 bit product, added to the partial product produced from the third cycle, presented to the normalizer and exception generator 409.

Figure 5:
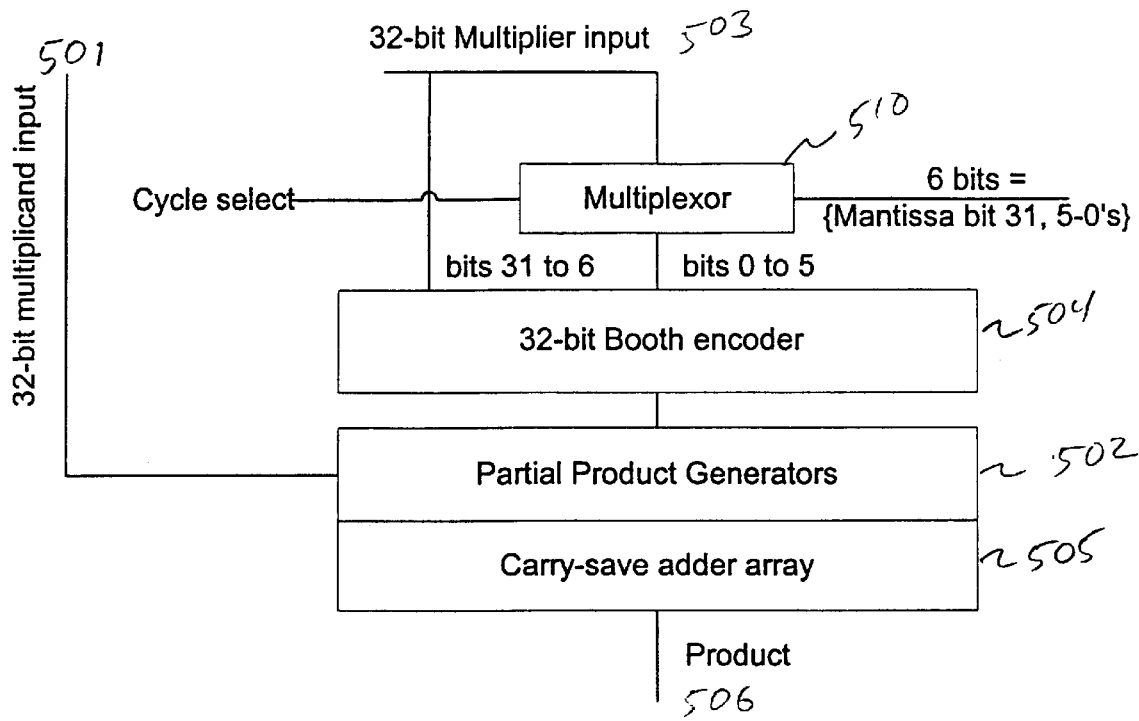
FIG. 5 a block diagram of the array multiplier of the floating point multiplier.
Figure 6:
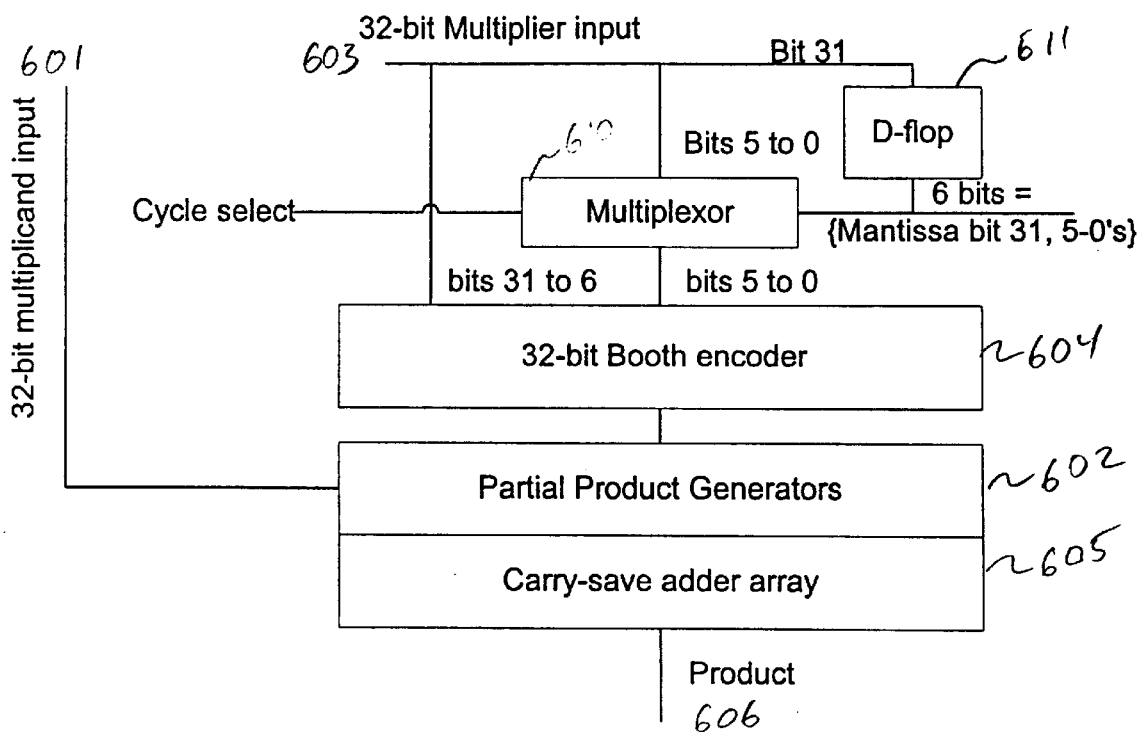
FIG. 6 a block diagram of the array multiplier of an alternative embodiment of the floating point multiplier, where a register preserves multiplier bit 31 from the third until the fourth cycle of the multiply.

The multiplier array 406 of the preferred and an alternative embodiment is shown in more detail in FIGS. 5 and 6. In both embodiments, a 32-bit multiplicand 501 and 601 is presented to an array of Booth-type partial product generators 502 and 602. A 32-bit multiplier 503 and 603 is broken into a 26-bit upper field and a 6-bit lower field, the 26-bit upper field is presented as the upper 26-bits of a 32-bit booth encoder 504 and 604. The booth encoder 504 and 604 feeds the multiplier input of the Booth-type partial product generators 502 and 602, with the partial products summed in a carry-save adder array 505 and 605 to form a 64-bit product term 506 and 606. The product term 506 and 606 is a mantissa product for single-precision multiply operations, and a partial product for double-precision multiply operations.

In the first embodiment, the 6-bit lower field of the multiplier input 503 is fed to a multiplexor 510. Multiplexor 510 may be implemented as part of the partial operand multiplexor. The second data input of multiplexor 510 is a 6-bit string formed by concatenating bit 31 of the multiplier exponent/mantissa splitter 401 and five bits of zero, and the control input of the multiplexor 510 is taken from sequential logic (not shown) that controls the operation of the multiplier. The control input is true only during the fourth cycle of the multiply operation. Multiplexor 510, which provides a fill for the low six bits when the partial operand multiplexor provides the 21 most significant bits of the multiplier in left-shifted-by-six-positions form, may be formed as part of the partial operand multiplexor.

In the first alternative embodiment, the 6-bit lower field of the multiplier input 603 is fed to a multiplexor 610. The other data input of multiplexor 610 is a 6-bit string formed by concatenating the output of a D-flop 611 and five bits of zero, with the control input of the multiplexor 510 is taken from sequential logic (not shown) that controls the operation of the multiplier. The control input is true only during the fourth cycle of the multiply operation. The input of the D-flop is bit 31 of the 32-bit multiplier input 603, the bits being numbered 31 for most significant and 0 for least significant.

Figure 7:
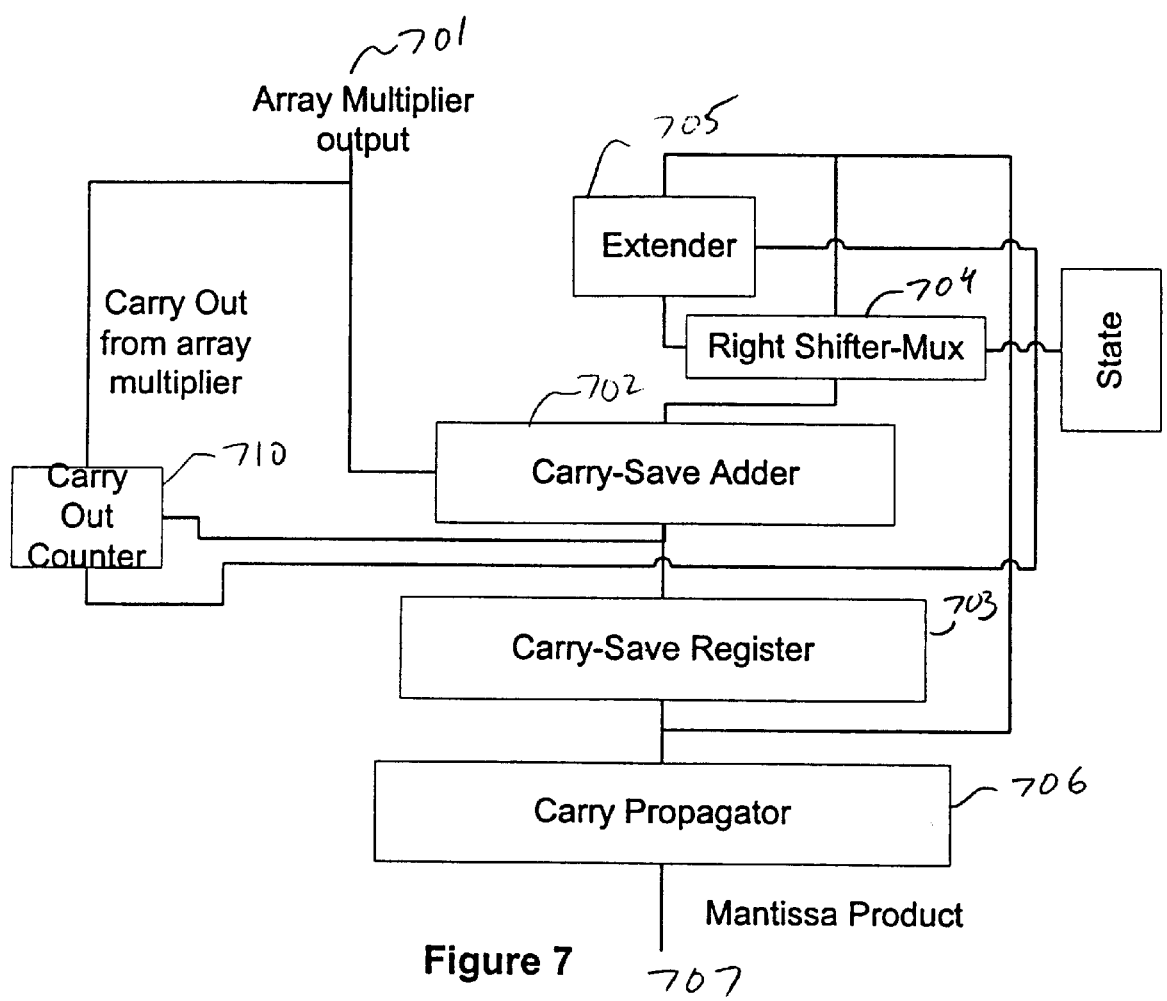
FIG. 7 a diagram of the shifter and partial product accumulator of a second alternative embodiment of the double-precision multiplier.

The shifter and partial product accumulator 408 (FIG. 4) for a second alternative embodiment is portrayed in FIG. 7. In this embodiment, the four partial products are added in carry-save format. In the first cycle, the 64-bit array multiplier output 701 is passed into Carry-Save adder 702, then latched in the low 64 bits, bits 63 through 0, of the carry save register 703 as the cycle completes.

During the first cycle, any explicit carry out from the carry-save Wallace-tree adders of the array multiplier 406 is latched as a count of one into a two-bit carry-out counter 710, without a carry-out the carry-out counter 710 is set to zero.

Since the second partial product is the product of a 21 bit by a 32 bit number, only the low 53 bits of the array multiplier output have significance in the second cycle. These bits of the second partial product are passed to bits the Carry Save adder 702 for addition. Simultaneously, the first partial product from the carry-save register 703 is conditionally extended with the complement of any explicit carry out of the adder array and right-shifted by 32 bit positions in the Right Shifter-Mux 704, the discarded bits being processed as required for correct rounding, the retained bits being fed back to the carry-save adder 702 for adding to the second partial product. The result of the addition is latched in the carry save register 703 as the second cycle of the multiply operation completes.

During the second cycle, any explicit carry out from bit 52 of the carry-save adders of the carry-save adder 702 increments carry-out counter 710.

The third partial product is also the product of a 21 bit by a 32 bit number, only the low 52 bits of the array multiplier output have significance in the third cycle. These bits of the third partial product are positioned by the bit positioner 704 for addition to the carry-save register 703, as fed back unchanged through the Right Shifter-Mux 705. The result of the addition is latched in the carry save register 703 as the third cycle of the double precision multiply operation completes.

During the third cycle, any explicit carry out from bit 52 of the carry-save adders of the carry-save adder 702 increments carry-out counter 710.

The fourth partial product is the product of a 21 bit by a 21 bit number, these numbers are adjusted as described above such that the 42 significant bits of the partial product are in bit positions 53 through 12 of the 64-bit array-multiplier output 701 in carry-save format. Alignment in these positions is advantageous in minimizing the rounding, normalizing, and exception handling logic. In the fourth cycle of the multiply operation, these 42 bits of the array multiplier output 701 are added to bits 52 through 0 of carry-save register 703, as extended in the extender 705. In extending the carry-save register in the fourth cycle, bits 63 through 53 are extended to a value determined by the carry-out counter 710. If the counter contains zero, bits 63 through 53 are driven to the binary value 11 1111 1101 (minus three). If the counter contains one, bits 63 through 53 are driven by the extender 705 to the binary value 11 1111 1110 (minus two). If the counter contains two, bits 63 through 53 are driven to the binary value 11 1111 1111 (minus one). If the counter contains three, bits 63 through 53 are driven to the binary value 00 0000 0000 (zero). The result of the addition is latched in the carry save register 703 as the fourth cycle of the double precision multiply operation completes.

In the fifth cycle of the double precision multiply operation, the carry save register 703 contents is passed through a carry propagating circuit 706 to produce an un-normalized mantissa product 707. This is then fed to the normalizer and exception generator.

Figure 8:
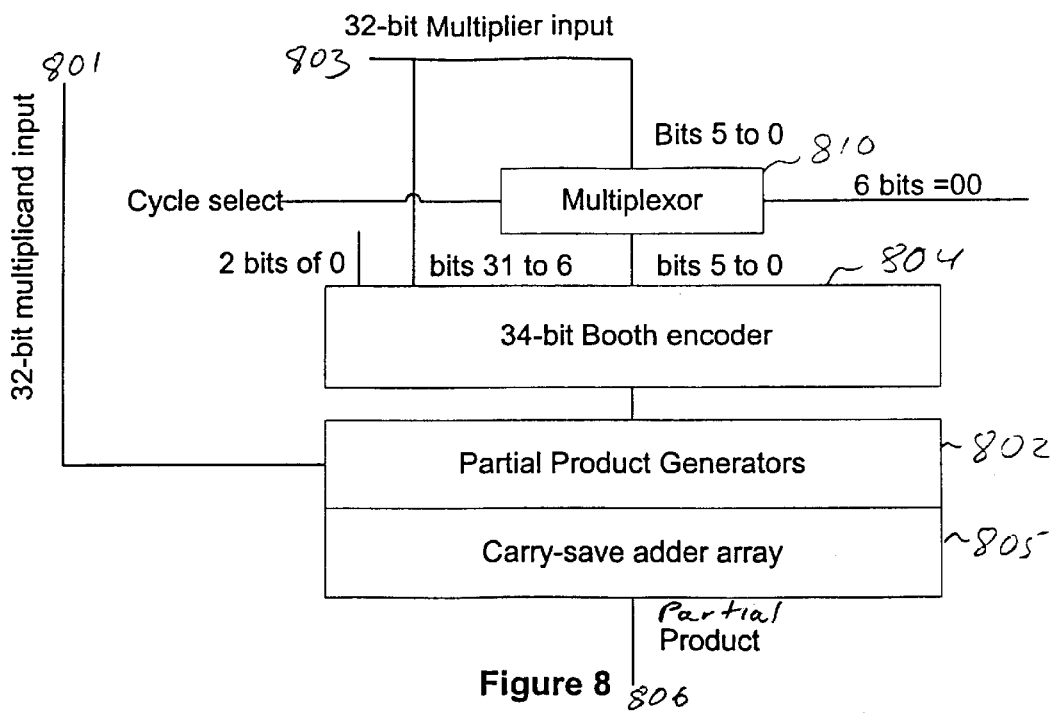
FIG. 8 a block diagram of the array multiplier of a third alternative embodiment of the floating point multiplier, wherein the least significant 32-bit bit field of the multiplier is zero extended to 34 bits prior to Booth recoding.

In a third alternative embodiment of the invention, as shown in FIG. 8, a 34 bit array multiplier booth encoder is used in place of the 32 bit multiplier encoder heretofore described. The multiplier array 406 of this embodiment is shown in more detail in FIG. 8. In this embodiment, a 32-bit multiplicand 801 is presented to an array of Booth-type partial product generators 802. The multiplicand partial operand multiplexor 405 zero fills the six least significant bits when it selects as a partial operand the high twenty-one bits of the multiplicand left shifted by six bit positions.

A 32-bit multiplier 803 is zero extended to 34 bits, then broken into a 28-bit upper field and a 6-bit lower field, the 28-bit upper field is presented as the upper 28-bits of a 34-bit booth encoder 804. Booth encoder 804 feeds the multiplier input of the Booth-type partial product generators 802, with the partial products summed in a carry-save adder array 805 to form a 64-bit product term 806. The product term 806 is a mantissa product for single-precision multiply operations, and a partial product for double-precision multiply operations.

In this embodiment, the 6-bit lower field of the multiplier input 803 is fed to a multiplexor 810. The second data input of multiplexor 810 is six bits of zero, and the control input of the multiplexor 810 is taken from a state machine (not shown) that controls operation of the multiplier. The control input selects the zero field only during the fourth cycle of the multiply operation.

In this embodiment, all of the partial products must be positive numbers, hence it is not necessary to multiplex bit 31 from the prior cycle to bit 6 of the booth encoder.

Figure 9:
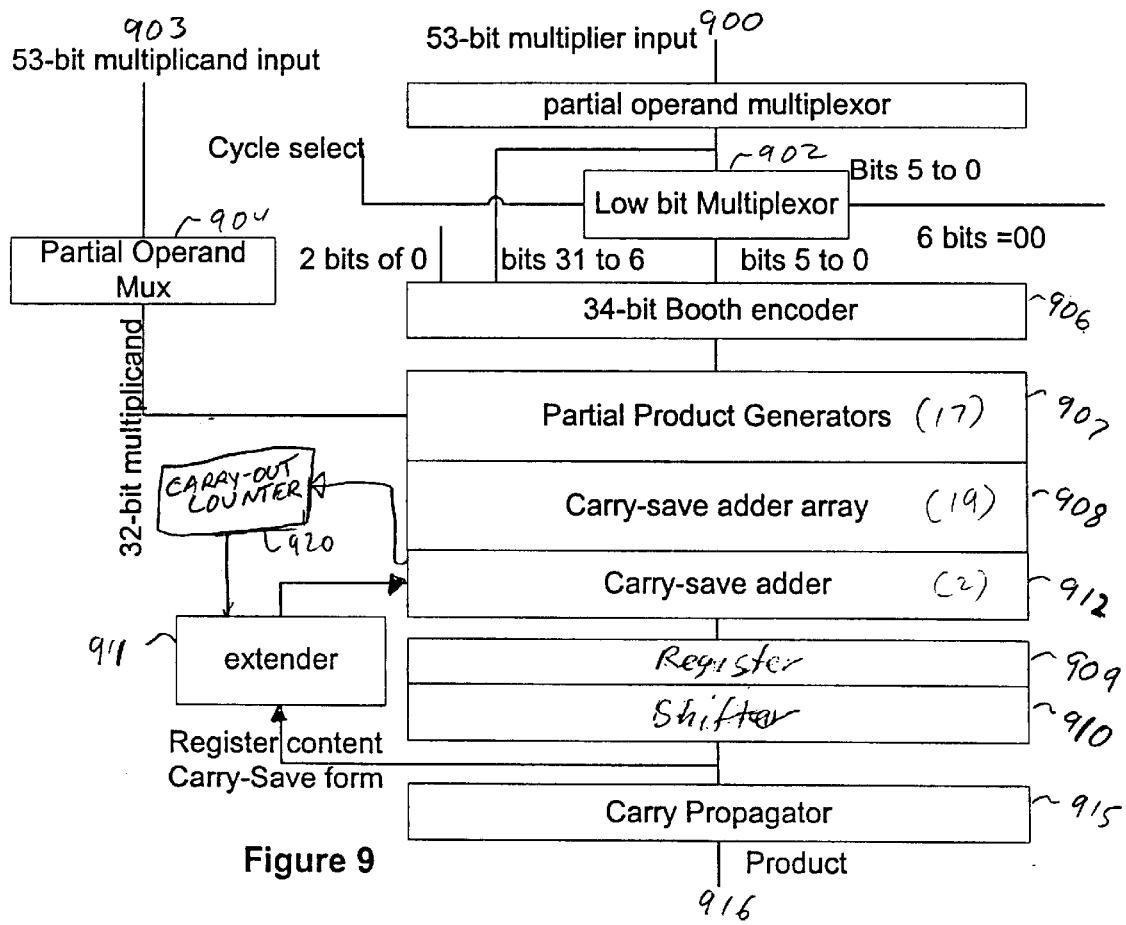
FIG. 9, a block diagram of the array multiplier, partial product accumulator, and multiplier partial operand multiplexor of an implementation of the third alternative embodiment wherein the adder of the partial product accumulator is laid-out together with the adders of the multiplier array.

The third alternative embodiment of FIG. 8 may be implemented with the partial-product accumulator carry-save adder laid out with the carry-save adder array of the multiplier array, as illustrated in FIG. 9. In this implementation, the 53-bit multiplier input 900 is selected by partial operand multiplexor 901 into a low 32-bit, a high 21-bit, or a high-21-bit-left-shifted-by-six-positions partial operand. When the partial operand multiplexor 901 selects the high-21-bit-left-shifted-by-six-positions partial operand, the low six bit positions are zero filled by a low bit multiplexor 902, that may be formed as part of the partial operand multiplexor 901.

Similarly, 53-bit multiplicand input 903 is selected by partial operand multiplexor 904 into a low 32-bit, a high 21-bit, or a high-21-bit-left-shifted-by-six-positions partial operand. When the partial operand multiplexor 904 selects the high-21-bit-left-shifted-by-six-positions partial operand, the low six bit positions are zero filled.

The partial operand from the multiplier partial operand multiplexor and low bit multiplexor 901 and 902 is zero-extended to 34 bits and Booth recoded by a 34-bit Booth encoder 906. A booth-recoded multiplier from booth encoder 906 controls a set of array multiplier partial product generators 907 that are part of an array multiplier and operate upon an output of the multiplicand partial operand multiplexor 904. The array multiplier partial products from the partial product generators 907 are summed in a carry-save adder array 908 that also forms part of the array multiplier, and added to any earlier partial product in a partial product accumulator register 909 as extended by extender 911 by a carry-save adder 910 that is laid out as an extension of the multiplier carry-save adder array 908. A sum from carry-save adder 910 is shifted in shifter 912 and deposited in the partial product accumulator register 909. Once all four partial products are accumulated in the partial product accumulator register 909, the carries are propagated by carry propagator 915 to produce an unnormalized mantissa product 916.

Each partial product from the carry-save adder array (804 and 908) is positive. Even if the most significant bit of a multiplier portion is one, in the embodiments of FIGS. 8 and 9 the final partial product from the array multiplier carry-save adder array (805 and 908) is positive since the multiplier is extended with zeros during Booth recoding and each multiplicand partial operand is positive. The final sum of all the partial products must also be positive. Thus, only the magnitude of the number need be represented.

Although the final result of the multiplication is positive, Booth partial product terms generated in the array multiplier can be, and often are, negative. These terms of the array multiplier must be effectively sign extended during addition.

Partial products in carry-save form comprise a sum vector and a carry vector, the carry vector representing unpropagated carries into the corresponding bits of the sum vector. A partial product in carry save form from carry-save adder array (804 and 908) may have a one in the most significant sum vector bit derived from carry-save addition of the negative Booth partial product terms generated in the array multiplier. This may occur in an implicit carry-out situation, with a one in the corresponding carry vector bit or data in lower bits that will emerge as a carry into the most significant bit if carry were propagated. In this case, a carry will occur from the most significant bit during carry propagation. If this carry-save form number is extended with more significant bits, those bits must have ones in either their sum or carry vectors so that carry propagation will flip those bits to the correct twos complement sign for a positive partial product of zero.

In the embodiments of FIGS. 7, 8, and 9, the partial product from carry-save adder array (805 and 908) is in sum and carry vector form, hence the carry-out may be explicit or implicit. Explicit carry-out is detected as the carry-out from the most significant bit in the carry-save adder (702 and 912) or from the array multiplier carry-save adders. Implicit carry-out is inherent in the carry and sum terms, the carry-out does not emerge until carry is propagated. In these embodiments, carry is propagated in the carry propagator (706 and 915) after all partial products are summed in the carry-save register (703 and 909). Explicit carry-out's may be dropped, however implicit carry-out's are hidden in both the carry and sum terms of the product and require sign extension for correct result.

These embodiments use conditional extension to effectively propagate carry from the lower order partial products into the significant bits of the higher order product. Since three carry-out's are expected (implicit or explicit, one and only one per partial product), the last recycled product term is conditionally extended depending upon the number of explicit carry-out's already present. Knowing that the total number of carry-out's expected is three, the number of implicit carry-out is equal to the total number minus the number of explicit carry-out's. Hence the conditional extension of the sum in carry-save form of the first three partial products during addition to the fourth partial product, the extension being based upon explicit carry-outs, is:

if zero explicit carry outs 1111 1111 01 (minus three)
if one explicit carry out 1111 1111 10 (minus two)
if two explicit carry outs 1111 1111 11 (minus one)
if three explicit carry outs 0000 0000 00. (zero)

It is these explicit carry outs that may occur during computation and summing of the first three partial products in carry-save form that are counted by carry-out counter (710 and 920). This carry-out count is used by the extender (705 and 911) to conditionally extend the sum of these first three partial products when that sum is right-shifted by shifter (704 and 910) and added to the fourth partial product.

The invention has been shown with reference to a particular preferred embodiment. It will be understood by those skilled in the art that various changes in form and details may be made without departing from the spirit and scope of the invention. For example, the division of the multiplier and multiplicand into partial operands may occur at different bit boundaries than the bit 32-31 boundary of the embodiments illustrated herein. If the bit boundaries are altered, it may be that the twos complement minus three, minus two, minus one, and zero values injected onto the most significant bits of the extender (705 and 911) output during the fourth partial product addition will comprise a different number of bits than the twelve bits illustrated herein. The order of the carry-save register, shifter, and extender in the partial product accumulator may be shuffled without preventing function. The double-precision multiplier may have additional states not herein discussed. Further, it is possible that the multiport register file may be divided into separate register arrays for the integer and for the floating point pipelines, or that the first three partial products be generated in a different sequence than that illustrated herein. It is understood that the invention is defined by the scope of the following claims.

We claim:

1. An array multiplier having inputs A and B and output O;

where B is a multiplicand;
where input A is a bit vector $\{A_n \ldots A_{m+1}, A_m, A_{m-1} \ldots A_0\}$;
the multiplier comprising:
a plurality of booth encoder circuits each receiving a pair of bits of vector A and a third input, and generating a booth encoded value, one of said plurality of booth encoder circuits having inputs $A_m$ and $A_{m+1}$, the booth encoder circuits generating a booth encoded value;
a multiplexor having an output bit $V_m$, said multiplexor having a control input S, said control input S being true only during a predetermined cycle of a multiply operation, said multiplexor having inputs C, said control input S, inputs C and bit Am of vector A coupled such that $V_m = S\&C | !S\&A_m$, wherein $V_m$ is coupled as the third input of the booth encoder having inputs $A_m$, and $A_{m+1}$ and another of the plurality of booth encoder circuits receives the $A_{m+2}$ and $A_{m+3}$ pair of bits of vector A and third input $A_{m+1}$;
a plurality of partial product generators wherein the booth encoded value and input B are used to generate a plurality of partial products;
and an adder tree wherein output O is computed by summing the partial products.

2. The array multiplier of claim 1 wherein the multiplexor input bit $V_{m-1}$ is bit $A_5$.

* * * * *